United States Patent Office

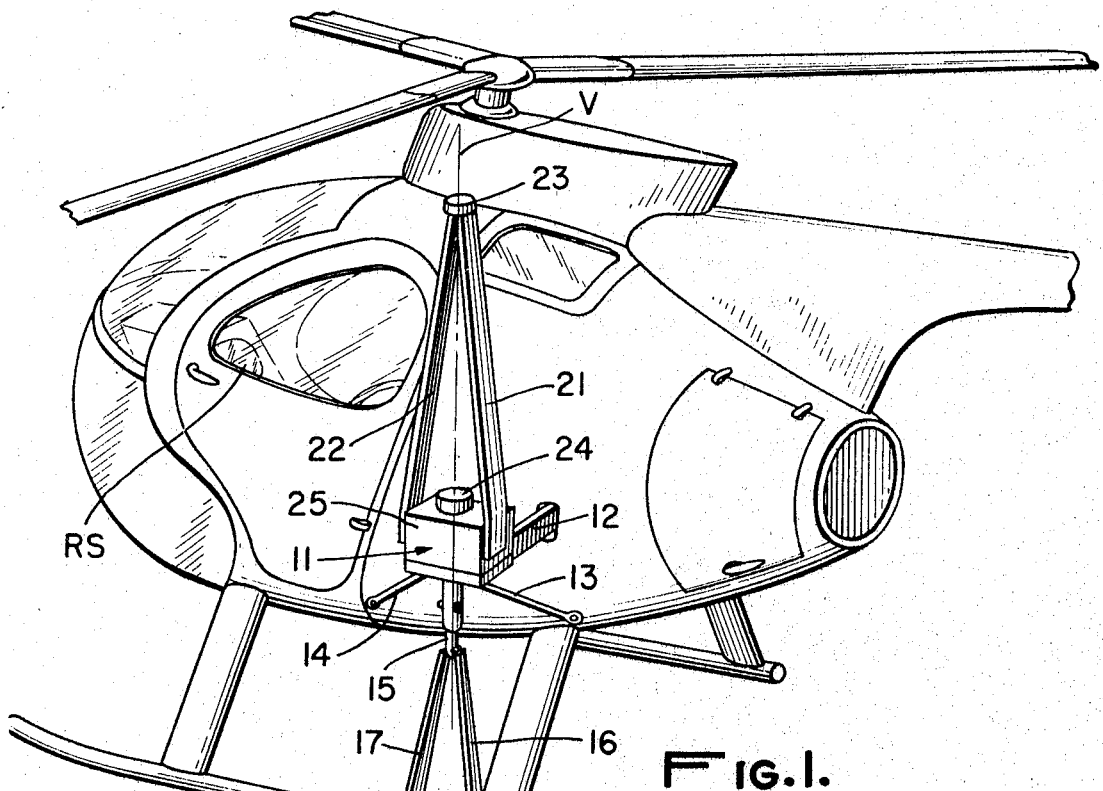
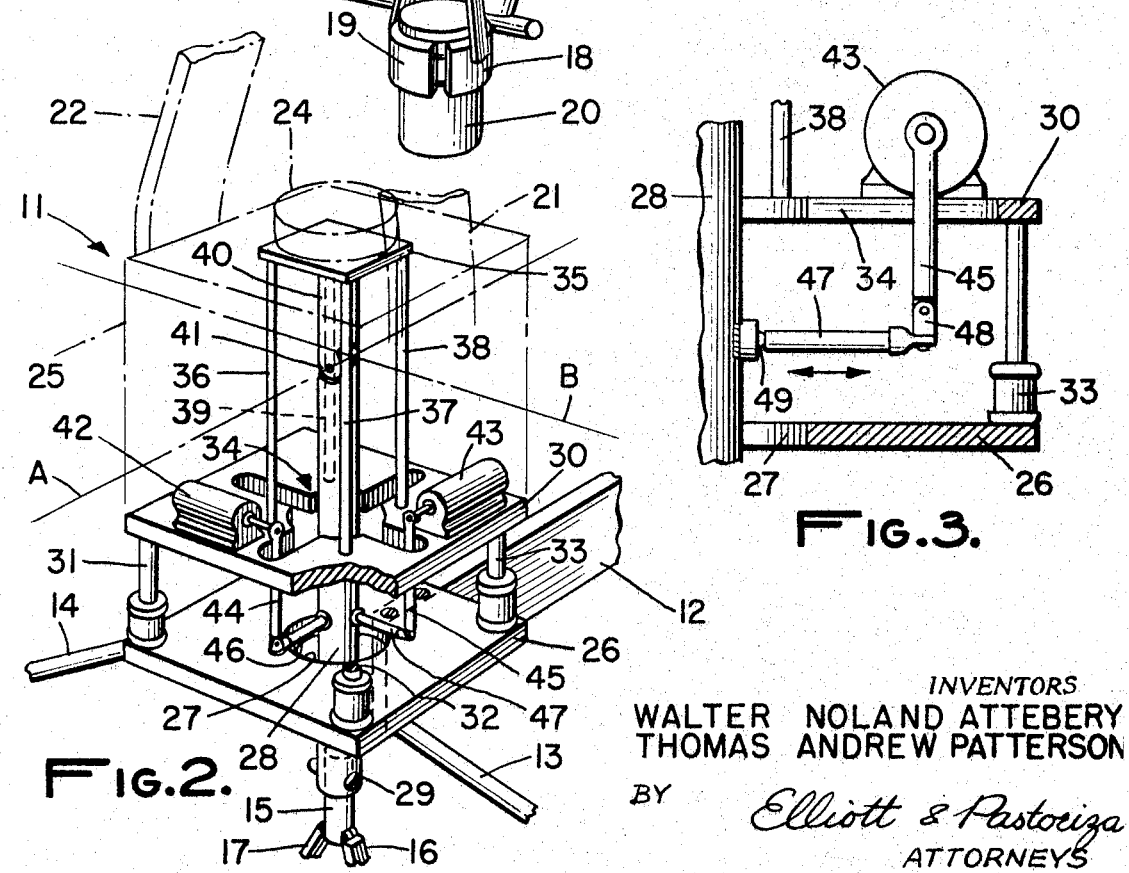

3,523,660
Patented Aug. 11, 1970

3,523,660
TELEVISION CAMERA MOUNTING STRUCTURE FOR HELICOPTERS USED IN AERIAL SURVEY WORK
Walter Noland Attebery, Ventura, and Thomas Andrew Patterson, Van Nuys, Calif., assignors to Condor Helicopters and Aviation, Inc., Oxnard, Calif., a corporation of California
Filed Feb. 5, 1968, Ser. No. 703,141
Int. Cl. B64c 27/00
U.S. Cl. 244—17.11                           3 Claims

ABSTRACT OF THE DISCLOSURE

A mounting means for a television camera and a signal light is provided for securement to the side of a helicopter. The mounting structure is such as to suspend the television camera in a pendulum-like manner so that the optical axis of the camera will always assume a vertical position. A monitoring television receiver in the helicopter thus enables a pilot to cause the helicopter to hover in a position directly vertically above a given point on the ground. The mounting structure itself includes a universal joint together with first and second damping devices cooperating together such that the suspended television camera will remain vertically aligned regardless of changes in the attitude of the helicopter.

---

This invention relates broadly to aerial survey work and more particularly to an improved mounting structure for supporting a television camera to the side of a helicopter in a manner to increase the accuracy and facilitate the overall operation of aerial survey.

The use of helicopters or "aerial platforms" in survey work is well known. Generally, a helicopter will hover vertically above a given point on the earth and its altitude is then used as one of the dimensions in triangulation processes for measuring various distances. The accuracy of such measurements depends in large part upon the ability of the helicopter pilot to maintain the helicopter in a hovering position directly vertically over the designated point on the surface of the earth.

Heretofore, the foregoing has been accomplished by providing a stereoscopic optical system in the helicopter including a light source adapted to be optically vertically aliged with a designated point on the ground. The pilot can then hold the helicopter in a position to maintain the vertical alignment. Such systems as have been provided require special modifications of the helicopter employed and are generally expensive in themselves. Further, the altitude of the helicopter for which such optical apparatus will operate effectively is somewhat limited depending upon ground conditions and the visual capabilities of the pilot.

With the foregoing in mind, it is a primary object of the present invention to provide an improved system for facilitating aerial survey work wherein many of the foregoing problems are reduced.

More particularly, it is an object to provide a system incorporating a television camera as opposed to a light system and wherein the camera is mounted on the side of a helicopter in such a manner that no major modifications of the helicopter itself are required. Another object is to provide a unique means for mounting a television camera to the side of a helicopter for cooperation with a monitoring television receiver in the helicopter wherein the television camera itself is maintained in a vertically aligned position notwithstanding variations in the attitude of the helicopter all to the end that the hovering position of the helicopter can be maintained in exact vertical position above a given point on the ground by simply observing this point through the monitoring receiver.

Briefly, these and many other objects and advantages of this invention are attained by providing a mounting structure readily securable to the sides of a helicopter and incorporating a first rigid member in the form of a plate. A second member is shock mounted to the plate and in turn supports a suspension means. This suspension means includes a universal joint and terminates at its lower end in a coupling collar for holding a television camera such that the camera will hang or be suspended in a pendulum-like manner. The shock mounted plate supports suitable damping units coupled through a suitable linkage to the suspension means so that oscillations or swinging movements of the camera are critically damped.

With the assurance that the television camera has its optical axis always in a vertical direction, the pilot of a helicopter may readily cause the helicopter to hover in an exact vertical position above a given point on the earth by observing this point in a monitoring receiver in the cockpit. The television camera may include a zoom type lens so that location of the point on the earth is greatly facilitated and a great increase in the vertical height at which the helicopter may hover accurately is possible.

A better understanding of the invention will be had by now referring to a preferred embodiment as illustrated in the accompanying drawings, in which:

FIG. 1 is a perspective view of the mounting means of the present invention shown in position on the side of a helicopter for use in aerial survey work;

FIG. 2 is an enlarged fragmentary perspective view illustrating details of the mounting structure; and FIG. 3 is a fragmentary cross section taken in the direction of the arrows 3—3 of FIG. 2.

Referring first to FIG. 1 there is shown a helicopter 10 which may be of any conventional design. A mounting structure 11 is secured to the side of the helicopter in accord with the present invention as by a main laterally extending brace 12 and first and second struts 13 and 14. These struts extend from the underside of the mounting structure 11 and connect to the side of the helicopter fore and aft of the lateral brace 12 at lower level positions.

An adapting structure in the form of a tube 15 and diverging side bars 16 and 17 terminating in collars 18 and 19 functions to support a television camera 20 in a depending position from the mounting structure 11. Upwardly extending converging bars 21 and 22 secured to the mounting structure 11 in turn support a signal light 23 which may constitute a high intensity discharge type of blinking lamp. A small heating unit 24 is mounted on the structure 11 for maintaining a fairly constant temperature of the mechanism within the mounting 11 for assuring proper suspension of the television camera all as will now become clearer by reference to FIG. 2.

In FIG. 2, a suitable enclosing housing 25 for the mechanism is illustrated in phantom lines so that the interior of the structure is clearly visible. The lateral brace 12 extending from the side of the helicopter serves to secure a first rigid member in the form of a plate 26 having a central opening 27. This opening receives through its lower end a first rod means or rigid tube structure 28. This structure in turn is detachably securable to the mounting tube 15 at the upper end of the television coupling structure as by means of a simple bolt fastener 29. By this arrangement, the television camera and associated coupling structure as described in FIG. 1 may be readily disconnected from the underside of the mounting structure without the necessity of removing the surrounding housing 25.

A second member in the form of a square plate 30 is shock mounted to the rigid plate 26 as by means of corner shock mounting rods three of which are shown at 31, 32 and 33. The plate 30 is thus held in substantially parallel vertically spaced relationship to the rigid plate 26 and includes a central opening 34 in vertical alignment with the opening 27. The opening 34 is irregularly shaped being provided with radially extending slots as shown.

A suspension means including a third smaller plate 35 is secured in a raised position above the shock mounted plate 30 as by suitable vertical rods 36, 37, 38 and 39. A second rod means 40 is secured to the underside of the plate 35 and extends downwardly in a generally vertically aligned position with the first rod means 28. The two rods are coupled together by a universal joint 41 so that universal swinging movements of the first rod means 28 can take place.

In order to prevent oscillation or over-swinging of the television camera, suitable first and second damping units are provided as indicated at 42 and 43. These units are mounted on the shock mounted plate 30 and may constitute silicon oil type dampers positioned at right angles to each other. In this respect, linkages such as indicated at 44 and 45 depend through the slots in the central opening 34 for the plate 30 and connect to cooperating links 46 and 47 respectively coupled to the first rod means 28.

With particular reference to FIG. 3, the connection of the link 47 to the link 45 is effected by a universal joint 48 and the connection of the other end of the link 47 to the first rod 28 is effected by a universal joint 49. Damping of the swinging motion of the rod thus takes place in two vertical planes at right angles to each other and thus any components of such motion will be damped. The resistance to movement of the links 44 and 46 from the damping units 42 and 43 is adjusted to provide critical damping for the particular mass of the suspended television camera involved.

In operation, a television camera such as shown at 20 in FIG. 1 is secured within the collars 18 and 19 and the mounting bars 16 and 17 together with the mounting tube 15 secured to the first rod means 28 in the mounting structure 12. The weight of the television camera and associated coupling structure will cause the first rod means 28 to depend vertically from the second rod means 40 in the mounting structure as a consequence of the universal joint 41.

During an aerial survey operation, the helicopter 10 will be flown to a position over a designated spot on the ground. The television camera 20 may, by use of a zoom lens, readily detect this designated spot on the ground and display the same in a monitoring receiving screen RS in the cockpit of the helicopter. The pilot can then maneuver the helicopter until the located spot on the ground is exactly centered on the television screen. Should the attitude of the helicopter vary from its desired horizontal level position, the television camera 20 will still be suspended in a vertical position as a consequence of the mounting means employed.

With the helicopter in a desired vertical position directly above the designated spot on the ground, its location can readily be ascertained by other personnel on the ground by observing the signal light 23. Suitable distance measurements can then be effected in the usual manner.

It should be noted that the entire structure is relatively simple and requires relatively little modification of any been wholly eliminated by the use of the television cam-type of helicopter. Complicated optics and the like have era and a simple monitoring screen in the cockpit. Further, and as mentioned heretofore, by employing a zoom lens and even appropriate filters, the versatility of the structure is greatly increased even in inclement weather.

From the foregoing description, it will thus be evident that the present invention provides a greatly improved mounting structure for use in aerial survey work wherein all of the objects set forth are fully realized.

What is claimed is:

1. A television camera mounting structure for helicopters for use in aerial survey work, comprising, in combination: a first member having a central opening and a laterally extending brace for securement to the side of a helicopter; strut means extending from the underside of said first member and secured to said side of said helicopter at a lower level than said brace and in positions respectively fore and aft of said brace; a second member having a central opening vertically spaced above said first member; shock mounting means extending between said first and second members for shock mounting said second member to said first member; a first rod means terminating at its lower end in means for supporting a television camera and passing vertically upwardly through said opening; a raised support plate secured to said second member at a given vertical spacing therefrom and including a central, downwardly depending second rod means; and universal joint means coupling said first rod means to said second rod means, whereby said first rod means will depend vertically from said second rod means to thereby assure vertical alignment of said first rod means and any television camera secured thereto with respect to the surface of the earth.

2. The structure of claim 1, including first and second damping means mounted on said second member; and linkage means passing through said central opening and coupling said damping means to said first rod means to dampen swinging motion components in vertical planes at right angles to each other, respectively, whereby over-swinging of said first rod means in any vertical plane is dampened and a television camera secured thereto will remain in a substantially vertically aligned position.

3. The structure of claim 1, including a housing positioned about the sides of said first and second members; and a signal light mounted to said housing in a position substantially along said vertical axis above said housing for indicating the location of said helicopter in the sky.

References Cited

UNITED STATES PATENTS

| | | | |
|---|---|---|---|
| 2,506,095 | 5/1950 | Mantz | 95—12.5 |
| 3,217,097 | 11/1965 | Pauli et al. | 244—17.17 X |
| 3,226,059 | 12/1965 | Paterson et al. | 244—17.17 |
| 3,380,310 | 4/1968 | Di Tommaso et al. | 95—12.5 X |

MILTON BUCHLER, Primary Examiner

P. E. SAUBERER, Assistant Examiner

U.S. Cl. X.R.

244—17.17; 95—12.5; 74—5.22